(12) United States Patent
Miyata

(10) Patent No.: US 8,862,357 B2
(45) Date of Patent: Oct. 14, 2014

(54) MOTION STABILIZER FOR COMBINED VEHICLE

(71) Applicant: Nissin Kogyo Co., Ltd., Ueda (JP)

(72) Inventor: Kazuaki Miyata, Ueda (JP)

(73) Assignee: Nissin Kogyo Co., Ltd., Nagano (JP)

( * ) Notice: Subject to any disclaimer, the term of this patent is extended or adjusted under 35 U.S.C. 154(b) by 0 days.

(21) Appl. No.: 13/851,157

(22) Filed: Mar. 27, 2013

(65) Prior Publication Data

US 2013/0261919 A1    Oct. 3, 2013

(30) Foreign Application Priority Data

Mar. 30, 2012    (JP) ................... 2012-081589

(51) Int. Cl.
*B60T 8/52* (2006.01)
*G06F 19/00* (2011.01)

(52) U.S. Cl.
USPC ................. 701/70; 701/50; 303/123

(58) Field of Classification Search
CPC ... B60T 2330/06; B60T 8/1755; B60T 8/248; B60T 8/52; B60T 8/1887; B60W 30/02; G06F 19/00
USPC .......... 701/70, 50, 69, 82; 303/123; 180/14.1, 180/14.6
See application file for complete search history.

(56) References Cited

U.S. PATENT DOCUMENTS

| | | | |
|---|---|---|---|
| 6,494,281 B1 | 12/2002 | Faye et al. | |
| 6,600,974 B1 * | 7/2003 | Traechtler | 701/1 |
| 8,180,543 B2 | 5/2012 | Futamura et al. | |
| 2006/0125313 A1 | 6/2006 | Gunne et al. | |
| 2008/0172163 A1 * | 7/2008 | Englert et al. | 701/83 |
| 2009/0005946 A1 | 1/2009 | Futamura et al. | |
| 2009/0105906 A1 * | 4/2009 | Hackney et al. | 701/38 |
| 2011/0029210 A1 * | 2/2011 | Wu et al. | 701/70 |
| 2013/0030665 A1 * | 1/2013 | Nishio et al. | 701/70 |

FOREIGN PATENT DOCUMENTS

| | | |
|---|---|---|
| JP | H07-108912 | 4/1995 |
| JP | 2001-206107 | 7/2001 |
| JP | 2002-503185 | 1/2002 |
| JP | 2009-12488 | 1/2009 |
| JP | 2009-185643 | 8/2009 |
| WO | WO 99/51475 | 10/1999 |
| WO | WO 2004/048171 | 6/2004 |

* cited by examiner

*Primary Examiner* — Tan Q Nguyen

(74) *Attorney, Agent, or Firm* — Hamre, Schumann, Mueller & Larson, P.C.

(57) ABSTRACT

A motion stabilizer for a combined vehicle includes a pendular motion determination unit configured to determine whether or not a pendular motion caused by a swaying motion of the trailer is imparted to the tractor, a braking control unit configured to exercise a braking control upon detection of the pendular motion, and an engine torque control unit configured to exercise an engine torque control for regulating an engine torque produced by an engine, which engine torque control includes placing a limitation on the engine torque upon detection of the pendular motion. A start of the engine torque control unit relaxing the limitation on the engine torque is timed to occur prior to a start of the braking control unit bringing the braking control to an end.

7 Claims, 6 Drawing Sheets

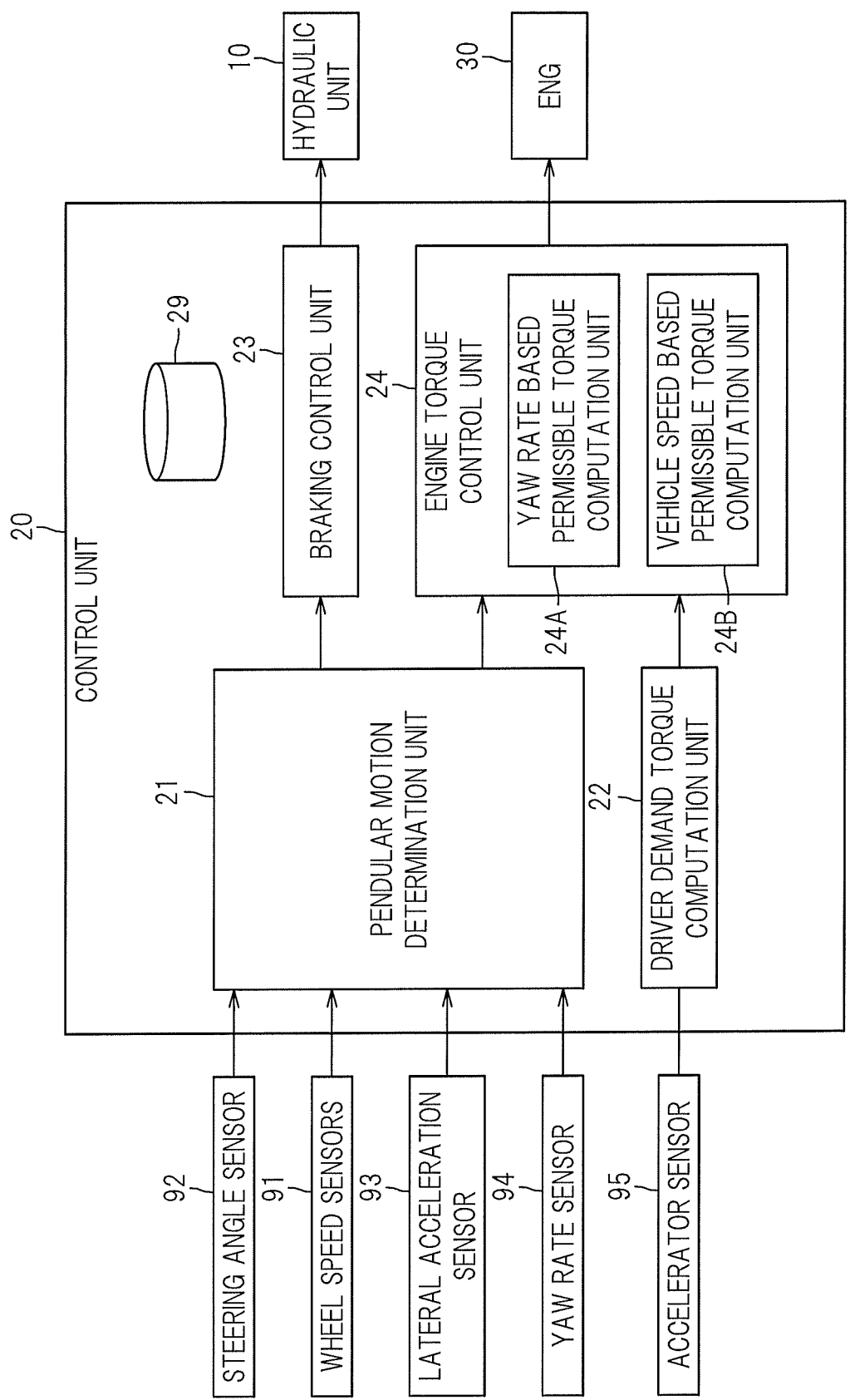

MOTION STABILIZER FOR COMBINED VEHICLE

CROSS-REFERENCE TO RELATED APPLICATION(S)

This application claims priority from Japanese Patent Application No. 2012-081589 filed on Mar. 30, 2012, the disclosure of which is incorporated herein by reference in its entirety.

BACKGROUND

The present invention relates generally to a motion stabilizer for a combined vehicle which includes a tractor and a trailer connected to the tractor, and particularly to a motion stabilizer in which an engine torque control is exercised to limit an engine torque upon detection of a pendular motion of a tractor.

JP 2002-503185 A (also published under WO99/51475A and U.S. Pat. No. 6,494,281 B1) discloses a motion stabilizer for a combined vehicle in which control exercised if a lateral motion characteristic value is greater than a threshold value involves a control of reducing an engine torque as well as a control of applying brakes.

When a tractor making a pendular motion starts shifting to a stabilized state thanks to a braking control and an engine torque limiting control (trailer stability control), a driver sometimes feels that the vehicle is in a stabilized state, even before a pendular motion imparted to the tractor is sufficiently reduced. In such an instance, the driver may depress the accelerator in an attempt to accelerate the vehicle; however, in a case where the engine torque limiting control is configured to go on until the trailer stability control comes to an end, the driver would feel uncomfortable because his/her attempts to accelerate the vehicle would fail due to the limited engine torque.

Against this backdrop, there is a need to provide a motion stabilizer for a combined vehicle, in which a braking control and an engine torque limiting control are exercised in response to detection of a pendular motion of a tractor, and which provides an improvement in a feel of drive which would possibly be impaired when the motion of the tractor starts shifting to a stabilized state.

SUMMARY

In one aspect, a motion stabilizer for a combined vehicle including a tractor and a trailer connected to the tractor is provided. The motion stabilizer comprises a pendular motion determination unit, a braking control unit and an engine torque control unit. The pendular motion determination unit is configured to determine whether or not a pendular motion caused by a swaying motion of the trailer is imparted to the tractor. The braking control unit is configured to exercise a braking control upon detection of the pendular motion. The engine torque control unit is configured to exercise an engine torque control for regulating an engine torque produced by an engine. The engine torque control includes placing a limitation on the engine torque upon detection of the pendular motion. A start of the engine torque control unit relaxing the limitation on the engine torque is timed to occur prior to a start of the braking control unit bringing the braking control to an end.

With this configuration, in which the limitation on the engine torque starts to be relaxed toward a state in which the limitation placed upon detection of the pendular motion is lifted, before the braking control starts to bring the braking control exercised upon detection of the pendular motion to an end, the driver becomes permitted to produce the engine torque by his/her operation on the accelerator from a time at or around the time when the driver starts to feel that the tractor is already back to a stabilized state. Accordingly, the driver can get a feel of acceleration according to his/her operation on the accelerator, and can thus be given an improved feel of drive which could otherwise be impaired when the motion of the tractor starts shifting to a stabilized state. Meanwhile, the braking control may be continued for the purpose of improving the feel of drive, so that the pendular motion of the tractor can be reduced steadily.

In the configuration described above, the engine torque control unit may be further configured to relax the limitation on the engine torque based upon at least one of a vehicle speed of the tractor and a value related to a yaw rate of the tractor.

With this additional feature, the limitation placed on the engine torque produced by the engine can be relaxed based upon a determination as to whether the acceleration of the tractor can be permitted, which is made based upon the vehicle speed of the tractor and/or a value related to the yaw rate of the tractor.

In the configuration described above, additionally, the engine torque control unit may comprise a yaw rate based permissible torque computation unit configured to compute a yaw rate based permissible torque that is increased if the value related to the yaw rate of the tractor is smaller than a first predetermined yaw rate, and a vehicle speed based permissible torque computation unit configured to compute a vehicle speed based permissible torque that is increased if the vehicle speed of the tractor is smaller than a first predetermined vehicle speed. The engine torque control unit may be configured to select, as an engine torque permissible limit, a greater one of the yaw rate based permissible torque and the vehicle speed based permissible torque, and to permit the engine torque to be produced within the engine torque permissible limit.

With these additional features, the greater of the yaw rate based permissible torque computed from the value related to the yaw rate and the vehicle speed permissible torque computed from the vehicle speed is selected as the engine torque permissible limit; this makes it possible to respond to the driver's operation on the accelerator at an earlier stage, so that a feel of drive can be improved more.

In the configuration described above, more specifically, the yaw rate based permissible torque computation unit may be configured to set the yaw rate based permissible torque at a predetermined maximum value if the value related to the yaw rate is smaller than a second predetermined yaw rate which is smaller than the first predetermined yaw rate, and to compute the yaw rate based permissible torque such that the yaw rate based permissible torque decreases with increase in the value related to the yaw rate, if the value related to the yaw rate is in a range of values smaller than the first predetermined yaw rate and not smaller than the second predetermined yaw rate.

Alternatively or additionally, the vehicle speed based permissible torque computation unit may be configured to set the vehicle speed based permissible torque at a predetermined maximum value if the vehicle speed is smaller than a second predetermined vehicle speed which is smaller than the first predetermined vehicle speed, and to compute the vehicle speed based permissible torque such that the vehicle speed based permissible torque decreases with increase in the vehicle speed if the vehicle speed is in a range of values smaller than the first predetermined vehicle speed and not smaller than the second predetermined vehicle speed.

In the above-described configurations, with or without the additional features as mentioned above, the braking control unit may be configured to decrease a hydraulic pressure for braking with a gradient on which a ceiling is imposed, from the start of the braking control unit ending the braking control up to a time when the braking control pressure becomes zero, and the engine torque control unit may be configured to select a smaller one of a driver demand torque determined by a driver's operation on an accelerator and the engine torque permissible limit, to determine a target engine torque by imposing a ceiling on a gradient of increase in a value of the selected smaller one, and to regulate the engine torque based upon the target engine torque, such that the target engine torque reaches the driver demand torque before the time when the braking control pressure becomes zero.

With this configuration, a time when the limitation placed on the engine torque is relaxed completely (i.e., eventually lifted) comes prior to a time when the braking control finally brings the braking control pressure to zero. Therefore, the behavior of the vehicle is made more responsive to the driver's operation on the accelerator in consonance with the driver's intention, so that a feel of drive can be improved more.

According to one or more embodiments as will be described below in detail, in a motion stabilizer for a combined vehicle, in which a braking control and an engine torque limiting control are exercised in response to detection of a pendular motion of a tractor, a feel of drive which would possibly be impaired when the motion of the tractor starts shifting to a stabilized state can be improved.

BRIEF DESCRIPTION OF THE DRAWINGS

The above aspects and advantages, other advantages and further features of the present invention will become more apparent by describing in detail illustrative, non-limiting embodiments thereof with reference to the accompanying drawings, in which:

FIG. 3 is a block diagram showing a general configuration of the motion stabilizer;

DETAILED DESCRIPTION OF THE EMBODIMENTS

A detailed description will be given of an illustrative embodiment of the present invention with reference to the drawings.

Figure 1:
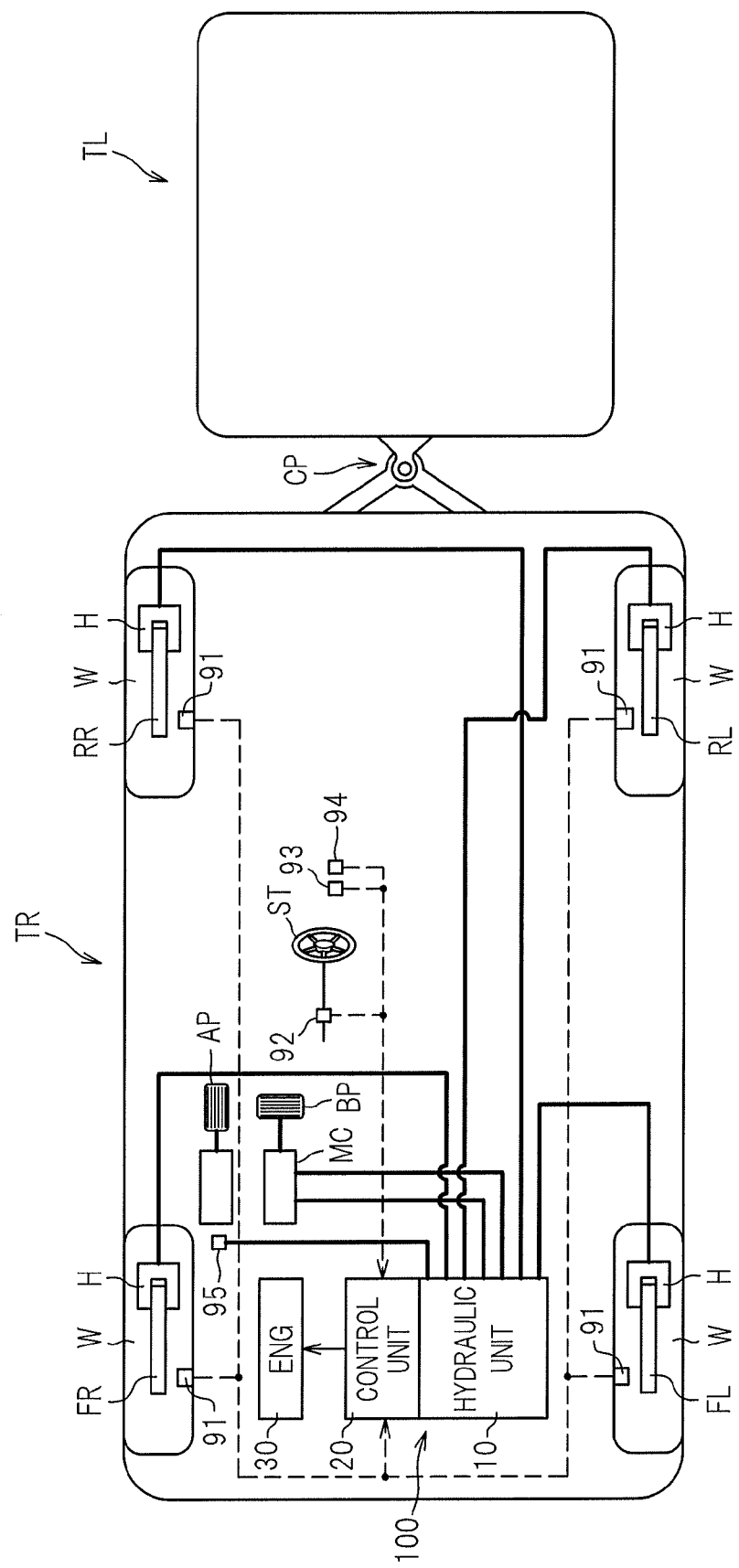
FIG. 1 is a schematic representation of a combined vehicle including a motion stabilizer according to one illustrative embodiment.

As shown in FIG. 1, a motion stabilizer 100 is an apparatus for controlling a braking force (hydraulic pressure for braking) applied to each wheel W of a tractor TR. The motion stabilizer 100 mainly includes a hydraulic unit 10 including hydraulic lines (hydraulic circuit) and various parts, and a control unit 20 configured to exercise control over the various parts provided in the hydraulic unit 10. To the tractor TR, a trailer TL is connected swingably in a lateral direction, via a coupler CP.

To the control unit 20, wheel speed sensors 91 configured to detect wheel speeds of the wheels W, a steering angle sensor 92 configured to detect a steering angle of a steering wheel ST, a lateral acceleration sensor 93 configured to detect an acceleration acting in the lateral (transverse) direction of the tractor TR (lateral acceleration), a yaw rate sensor 94 configured to detect an actual yaw rate of the tractor TR, and an accelerator sensor 95 configured to detect an amount of operation on an accelerator pedal AP are connected. The detection outputs of these sensors 91-95 are provided to the control unit 20.

The control unit 20 includes, for example, a central processing unit (CPU), a random access memory (RAM), a read-only memory (ROM), and an input/output circuit. The control unit 20 is configured to exercise control by executing various operations/computations (processing) based upon input data from the wheel speed sensors 91, the steering angle sensor 92, the lateral acceleration sensor 93, the yaw rate sensor 94 and the accelerator sensor 95, and programs and data stored in the ROM.

Wheel cylinders H are hydraulic systems configured to convert a hydraulic pressure for braking generated by a master cylinder MC and the motion stabilizer 100 into driving forces for wheel brakes FR, FL, RR, RL provided at the respective wheels W, and are connected to the hydraulic unit 10 of the motion stabilizer 100 through piping. The master cylinder MC is a hydraulic pressure source configured to generate a hydraulic pressure for braking, which varies according to a depressing force applied by the driver to the brake pedal BP.

Figure 2:
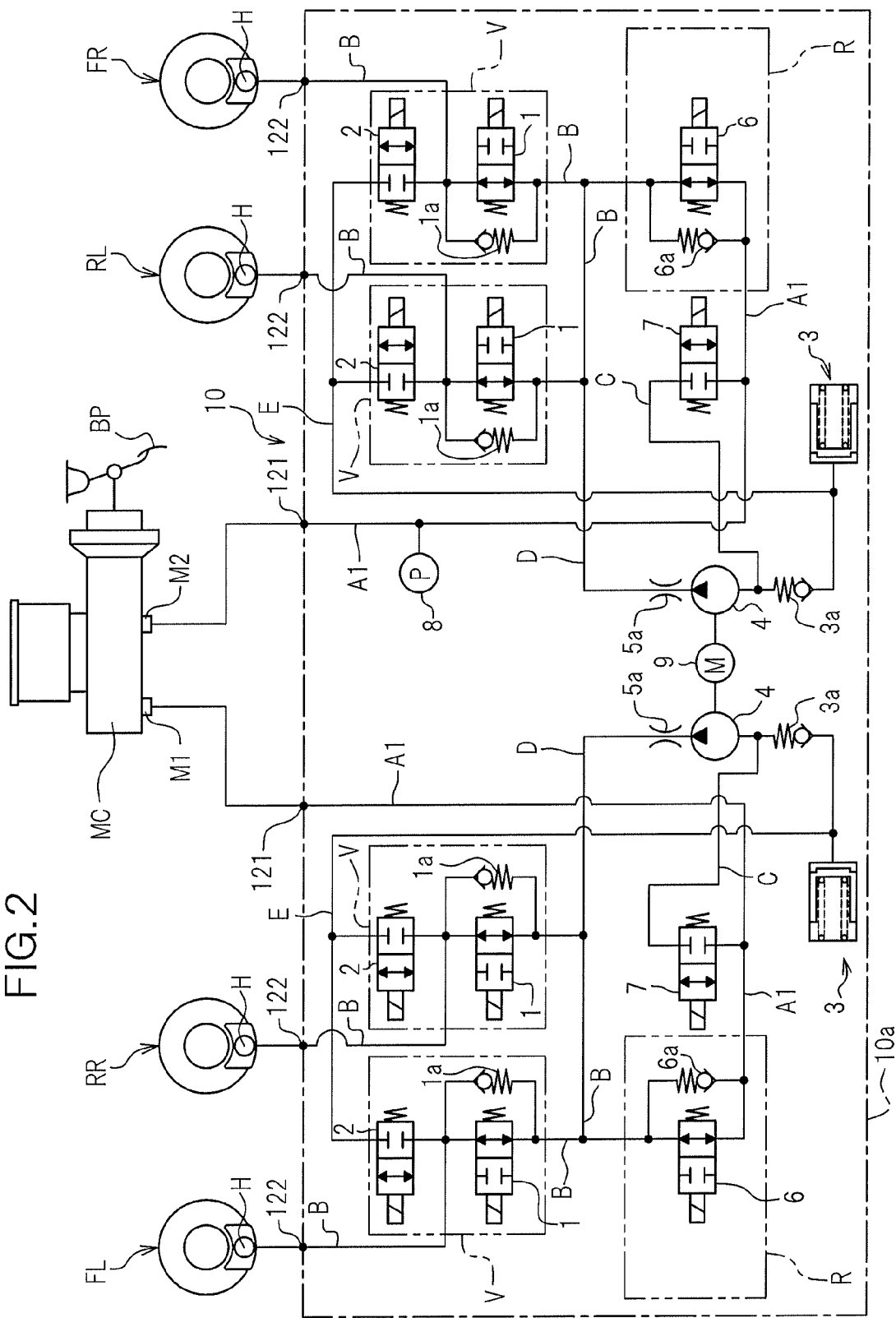
FIG. 2 is a schematic diagram of a brake hydraulic circuit for the motion stabilizer.

As shown in FIG. 2, the hydraulic unit 10 is disposed between the master cylinder MC and the wheel brakes FR, FL, RR, RL. The hydraulic unit 10 includes a pump body 10a that is a base body having hydraulic lines for circulation of the brake fluid. The hydraulic unit 10 further includes various parts such as inlet valves 1 and outlet valves 2 disposed on the hydraulic lines.

The master cylinder MC has two output ports M1, M2 connected to inlet ports 121 of the pump body 10a, which has outlet ports 122 connected to the wheel brakes FR, FL, RR, RL, respectively. During the normal operation, the hydraulic lines from the inlet ports 121 to the outlet ports 122 in the pump body 10a are open in fluid communication throughout so that the depressing force applied to the brake pedal BP is transmitted to the wheel brakes FL, RR, RL, FR.

The hydraulic line extending from the output port M1 is in communication with the front left wheel brake FL and the rear right wheel brake RR, and the hydraulic line extending from the output port M2 is in communication with the front right wheel brake FR and the rear left wheel brake RL. In the following discussion, the hydraulic line extending from the output port M1 will be referred to as "first system", and the hydraulic line extending from the output port M2 will be referred to as "second system".

The hydraulic unit 10 includes four control valve devices V of which two devices V corresponding to the wheel brakes FL, RR are provided in the first system, and two devices V corresponding to the wheel brake RL, FR are provided in the second system. The hydraulic unit 10 also includes two sets of a reservoir 3, a pump 4, an orifice 5a, a pressure-regulating valve assembly (regulator) R, and a suction valve 7, of which one set is provided in the first system and the other set is provided in the second system. The hydraulic unit 10 further includes a common motor 9 for driving the pump 4 of the first system and the pump 4 of the second system. This motor 9 is configured to be rpm controllable; that is, the rotation speed of the motor 9 can be controlled. In this embodiment, the hydraulic unit 10 further includes a pressure sensor 8 which is however provided only in the second system.

Hereinbelow, the hydraulic lines extending from the output ports M1, M2 of the master cylinder MC to the pressure-regulating valve assemblies R will be referred to as "output hydraulic line(s) A1", the hydraulic line extending from the pressure-regulating valve assembly R of the first system to the wheel brakes FL, RR and the hydraulic line extending from the pressure-regulating valve assembly R of the second system to the wheel brakes RL, FR will be referred to, respectively, as "wheel hydraulic line(s) B". The hydraulic lines extending from the output hydraulic line A1 to the pumps 4 will be referred to, respectively, as "suction hydraulic line C", and the hydraulic lines extending from the pumps 4 to the wheel hydraulic lines B will be referred to, respectively, as "discharge hydraulic line(s) D", and the hydraulic lines extending from the wheel hydraulic lines B to the suction hydraulic lines C will be referred to, respectively, as "release line(s) E".

The control valve devices V are valve units configured to control transmission of the hydraulic pressure from the master cylinder MC or the pumps 4 to the wheel brakes FL, RR, RL, FR (specifically, wheel cylinders H thereof). The control valve devices V are configured to increase, maintain and decrease the pressures of the wheel cylinders H. For that purpose, each control valve device V includes an inlet valve 1, an outlet valve 2 and a check valve 1a.

The inlet valve 1 is a normally open solenoid valve provided in the wheel hydraulic line B between each of the wheel brakes FL, RR, RL, FR and the master cylinder MC. The inlet valve 1 is configured to be normally open so as to permit transmission of the hydraulic pressure for braking from the master cylinder MC to the wheel brake FL, FR, RL, RR. The inlet valve 1 is also configured to be closed when the wheel W comes close to lockup, under control of the control unit 20 so as to interrupt transmission of the hydraulic pressure for braking from the brake pedal BP to the wheel brake FL, FR, RL, RR.

The outlet valve 2 is a normally closed solenoid valve provided between each wheel brake FL, RR, RL, FR and a corresponding reservoir 3, that is between the wheel hydraulic line B and the release line E. The outlet valve 2 is configured to be normally closed, and to be opened when the wheel W comes close to lockup, under control of the control unit 20 so as to release the hydraulic pressure for braking which would act on the corresponding wheel brake FL, FR, RL, RR into the corresponding reservoir 3.

Each check valve 1a is connected in parallel to a corresponding inlet valve 1. This check valve 1a is a one-way valve configured to permit a flow of brake fluid only in one direction from the wheel brake FL, FR, RL, RR to the master cylinder MC. When the depressing force of the brake pedal BP is released with the inlet valve 1 kept closed, the brake fluid is permitted to flow from the wheel brake FL, FR, RL, RR to the master cylinder MC through the check valve 1a.

The reservoir 3 is provided on the release line E, and configured to absorb the hydraulic pressure for braking released by opening the outlet valve 2. A check valve 3a configured to permit a flow of brake fluid only in one direction from the reservoir 3 to the pump 4 is provided between the reservoir 3 and the pump 4.

The pump 4 is provided between one end of the suction hydraulic line C of which the other end is connected to the output hydraulic line A1 and one end of the discharge hydraulic line D of which the other end is connected to the wheel hydraulic line B, and configured to suck the brake fluid stored in the reservoir 3 and discharge the sucked brake fluid into the discharge hydraulic line D. With this arrangement, not only can the brake fluid sucked in the reservoir 3 be returned back to the master cylinder MC, but also can a braking force be produced for the wheel brake FL, RR, RL, FR by generating a hydraulic pressure for braking.

The quantity of the brake fluid discharged by the pump 4 depends on the rotation speed (rpm) of the motor 9. For example, the greater the rotation speed of the motor 9, the larger the quantity of the brake fluid discharged by the pump 4 becomes.

The orifice 5a is configured to serve to damp pulsation of pressure in the brake fluid discharged from the pump 4.

The pressure-regulating valve assembly R is normally open to permit a flow of brake fluid from the output hydraulic line A1 to the wheel hydraulic line B. Moreover, the pressure-regulating valve assembly R is configured to interrupt a flow of brake fluid when the pressure in the wheel cylinder H is to be increased by the hydraulic pressure for braking generated by the pump 4, and is further configured to regulate the pressures in the discharge hydraulic line D, the wheel hydraulic line B and the wheel cylinder H to a set value or smaller. For that purpose, each pressure-regulating valve assembly R includes a switch valve 6 and a check valve 6a.

The switch valve 6 is a normally open linear solenoid valve disposed between one end of the output hydraulic line A1 of which the other end is connected to the master cylinder MC and one end of the wheel hydraulic line B of which the other end is connected to the wheel brake FL, FR, RL, RR. Although not illustrated in detail, the valve body of the switch valve 6 is biased toward the wheel hydraulic line B and the wheel cylinder H by an electromagnetic force which varies according to an electric current supplied thereto. Thus, if the pressure in the wheel hydraulic line B is greater than the pressure in the output hydraulic line A1 by a predetermined value or greater (this predetermined value varies depending on the electric current supplied), the brake fluid is released from the wheel hydraulic line B to the output hydraulic line A1 so that the pressure in the wheel hydraulic line B is regulated to the predetermined value.

Each check valve 6a is connected in parallel to the corresponding switch valve 6. This check valve 6a is a one-way valve configured to permit a flow of brake fluid from the output hydraulic line A1 to the wheel hydraulic line B.

The suction valve 7 is a normally closed solenoid valve provided in the suction hydraulic line C, and configured to switch the suction hydraulic line C to an open state or to a closed state. The suction valve 7 is released (opened) under control of the control unit 20, if the switch valve 6 is closed, that is, when a hydraulic pressure for braking is applied to each wheel brake FL, FR, RL, RR without the driver's operation of the brake pedal BP.

The pressure sensor 8 is configured to detect (measure) a hydraulic pressure for braking in the output hydraulic line A1 in the second system. The results of detection of the pressure sensor 8 are provided to the control unit 20.

The next discussion focuses on the control unit 20.

As shown in FIG. 3, the control unit 20 exercises control over the open/close operations of the control valve devices V, the switch valves 6 (pressure-regulating valve assemblies R) and suction valves 7 provided in the hydraulic unit 10, and the operation of the motor 9, based upon signals received from the wheel speed sensors 91, the steering angle sensor 92, the lateral acceleration sensor 93, the yaw rate sensor 94 and the accelerator sensor 95, so that the operations of the wheel brakes FL, RR, RL, FR are regulated and the engine torque produced by an engine 30 is regulated by controlling a throttle (not shown) of the engine 30. The control unit 20 includes a pendular motion determination unit 21, a driver demand torque computation unit 22, a braking control unit 23, an engine torque control unit 24, and a memory unit 29.

The pendular motion determination unit 21 is configured to determine whether or not a pendular motion (e.g., pendular motion caused by a swaying motion of the trailer TL) is imparted to the tractor TR, based upon signals received from the sensors 91-94, so that the result of determination can be used in the braking control unit 23 and the engine torque control unit 24. The determination as to whether the pendular motion is imparted to the tractor TR may be made by a method know in the art without limitation.

To give a simple example of determination scheme, a determination of the pendular motion being imparted may be made if a value related to a yaw rate (e.g., the amplitude of the yaw rate or a yaw rate derivative obtained by differentiation of the yaw rate) is greater than a predetermined threshold. The result of determination made by the pendular motion determination unit 21 is outputted to the braking control unit 23 and the engine torque control unit 24. In addition, the result of determination is stored in the memory unit 29 as a determination flag.

The driver demand torque computation unit 22 is a known device configured to compute a driver demand torque RT that is a driver's intended engine torque, based upon a throttling level of an accelerator obtained by the accelerator sensor 95. For example, the driver demand torque RT as computed by the driver demand torque computation unit 22 may be a value which increases with the throttling level of the accelerator and increases more if the speed of depressing an accelerator pedal is greater than a predetermined level. The driver demand torque RT computed by the driver demand torque computation unit 22 is outputted to the engine torque control unit 24.

The braking control unit 23 is configured to exercise control over the motor 9 and the valves in the hydraulic unit 10 described above if the pendular motion determination unit 21 detects the pendular motion, so as to apply appropriate braking forces to one or more wheels W selected adequately among the wheels W, thereby stabilizing the motion (behavior) of the tractor TR and the trailer TL. Selection of the wheel(s) W to which the braking force is to be applied and the timing of application of the braking force to each selected wheel W may be determined appropriately according to any method known in the art without limitation; for example, a yaw moment directed toward a side reverse to a yaw moment imparted to the vehicle at that instant may be produced to a relevant wheel(s) W in accordance with a method disclosed in JP 2009-012488 A (also published under US 2009/0005946 A1 which issued later under U.S. Pat. No. 8,180,543 B2). In the present embodiment, the braking control unit 23 is configured to gradually increase a braking force with an ascending gradient on which a ceiling is imposed at an earlier stage of the braking control, and to gradually decrease the braking force with a descending gradient on which a ceiling is imposed at an later stage of the braking control, so that an abrupt change of the braking force is prevented.

The engine torque control unit 24 is configured to exercise an engine torque control for regulating a torque produced by an engine 30 which engine torque control includes placing a limitation on the engine torque by regulating the throttle of the engine 30 when the pendular motion is detected by the pendular motion determination unit 21. The engine torque control unit 24 includes a yaw rate based permissible torque computation unit 24A and a vehicle speed based permissible torque unit 24B.

Figure 4A:
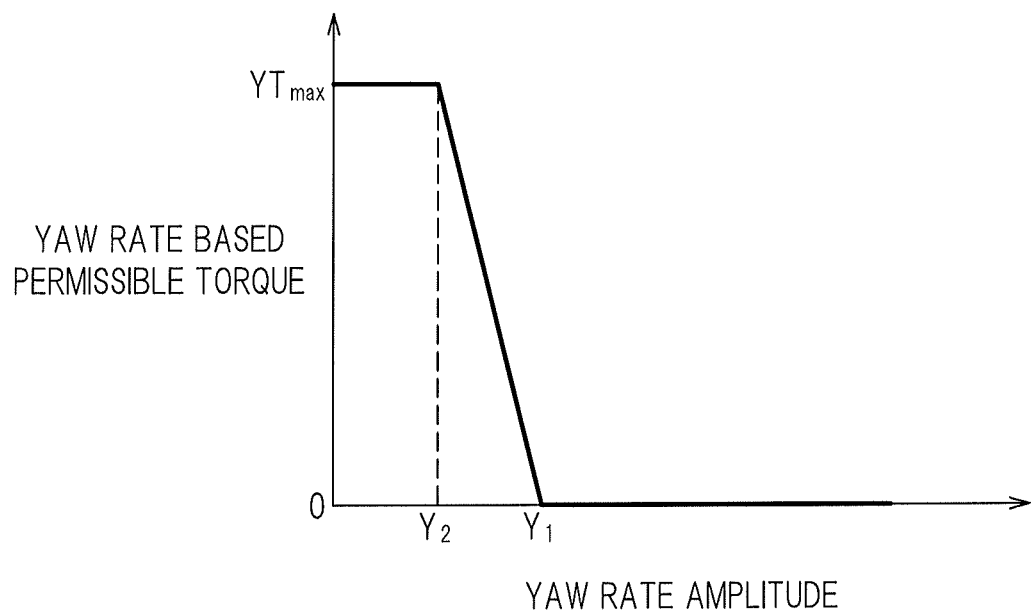
FIG. 4A is a map representing a relationship between a yaw rate amplitude and a yaw rate based permissible torque.

The yaw rate based permissible torque computation unit 24A is configured to compute a permissible torque of the engine 30 from a yaw rate of the tractor TR. In the present embodiment, a yaw rate amplitude (a value obtained by subjecting an absolute value of the yaw rate to a filter for removing abrupt fluctuations) is used as a parameter to compute a yaw rate based permissible torque YT based upon a map as shown in FIG. 4A from a yaw rate amplitude. The map shown in FIG. 4A provides that the yaw rate based permissible torque YT takes a value=0 if the yaw rate amplitude is equal to or greater than a first predetermined yaw rate $Y_1$, and takes a maximum value YTmax (predetermined such that no limitation is imposed on the engine torque) if the yaw rate amplitude is smaller than a second predetermined yaw rate $Y_2$ that is smaller than the first predetermined yaw rate $Y_1$, and takes a value decreasing gradually with increase in the yaw rate amplitude if the yaw rate amplitude is in a range of values smaller than the first predetermined yaw rate $Y_1$ and not smaller than the second predetermined yaw rate $Y_2$.

Further, in the present embodiment, if no pendular motion is detected, the yaw rate based permissible torque YT is computed without using the map of FIG. 4A, and is set at the maximum value with which no limitation is imposed on the engine torque. The first predetermined yaw rate $Y_1$ set on the map of FIG. 4A for use in the yaw rate permissible torque YT is a value having a yaw rate amplitude greater than that observed when the pendular motion determination unit 21 determines that the pendular motion has ended. In other words, the first predetermined yaw rate Y1 has a properly adjusted value such that the yaw rate based permissible torque YT is likely to become greater than zero before determination that the pendular motion has ended.

Figure 4B:
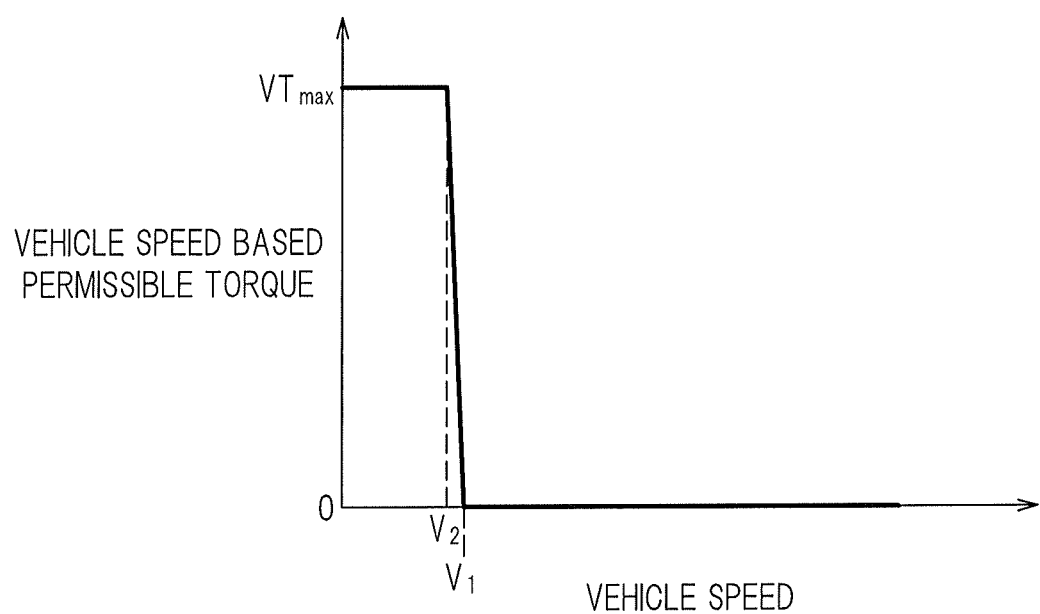
FIG. 4B is a map representing a relationship between a vehicle speed and a vehicle speed based permissible torque.

The vehicle speed based permissible torque computation unit 24B is configured to compute a permissible torque of the engine 30 from the vehicle speed of the tractor TR. In the present embodiment, the vehicle speed is used as a parameter to compute a vehicle speed based permissible torque VT based upon a map as shown in FIG. 4B from the vehicle speed. The map shown in FIG. 4B provides that the vehicle speed based permissible torque VT takes a value=0 if the vehicle speed is equal to or greater than a first predetermined vehicle speed $V_1$, and takes a maximum value VTmax (predetermined such that no limitation is imposed on the engine torque) if the vehicle speed is smaller than a second predetermined vehicle speed $V_2$ that is smaller than the first predetermined vehicle speed $V_1$, and takes a value decreasing gradually with increase in the vehicle speed if the vehicle speed is in a range of values smaller than the first predetermined vehicle speed $V_1$ and not smaller than the second predetermined vehicle speed $V_2$. Further, in the present embodiment, if no pendular motion is detected, the vehicle speed based permissible torque VT is computed without using the map of FIG. 4B, and is set at the maximum value with which no limitation is imposed on the engine torque.

The engine torque control unit 24 is configured to select, as a tentative engine torque $ET_O$, a greater one of the yaw rate based permissible torque YT computed by the yaw rate based permissible torque computation unit 24A and the vehicle speed based permissible torque VT computed by the vehicle speed based permissible torque computation unit 24B. The engine torque control unit 24 is further configured to select a smaller one of the selected engine torque $ET_O$ and the driver demand torque RT to obtain a current target engine torque $ET_n$ (n is a natural number indicating a moment at which the target engine torque is obtained). In this embodiment, the engine torque control unit 24 is configured to set the current target engine torque $ET_n$ to the driver demand torque RT, if no pendular motion is detected.

The engine torque control unit 24 is further configured to impose a ceiling on a gradient of increase or decrease of the engine torque when increasing or decreasing the engine torque toward the target engine torque $ET_n$, in order to avoid a rapid change in behavior of the tractor TR.

In the present embodiment, the value of the target engine torque $ET_n$ with the ceiling imposed on the gradient of the increase thereof and the gradient of the decrease of the braking control pressure as regulated by the braking control unit 23 are properly adjusted so that the target engine torque $ET_n$ reaches the driver demand torque RT before the time when the braking control pressure regulated by the braking control unit 23 becomes zero. In other words, the gradient of the decrease of the braking control pressure is made relatively gentle so that the time for the braking control unit 23 to decrease the braking control pressure is made relatively long.

The memory unit 29 is a device configured to store values of results of detection by the sensors, variables and constants required for computation of various values, maps as shown in FIGS. 4A and 4B, and various other data.

Operation of the control unit 20 of the motion stabilizer 100 configured as described above is described hereinbelow.

Figure 5:
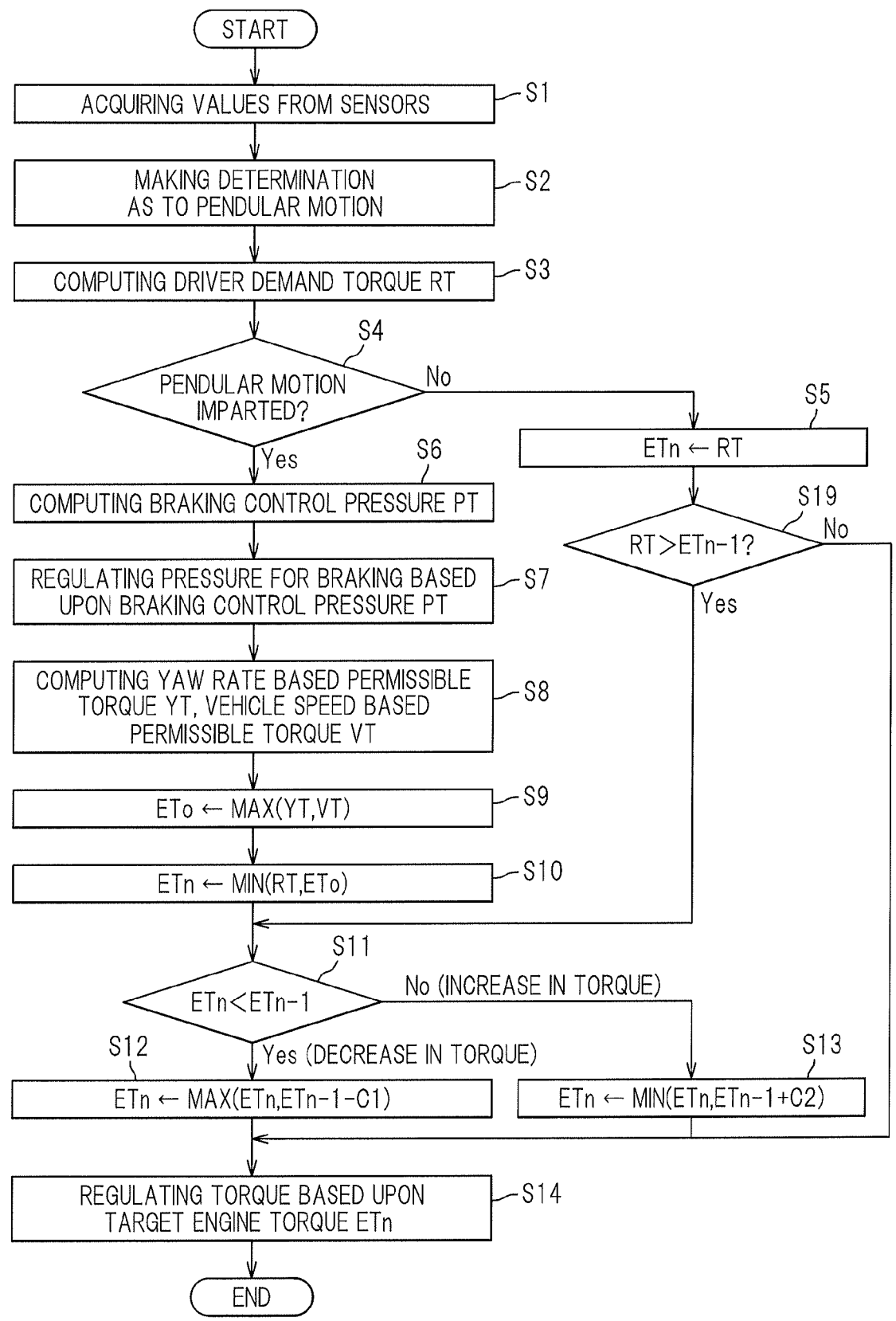
FIG. 5 is a flowchart showing a process of the motion stabilizer.

As shown in FIG. 5, the control unit 20 first receives (acquires) values of detection results from the sensors 91-95 (S1). Then, the pendular motion determination unit 21 determines whether or not a pendular motion is imparted to the tractor TR, based upon the values of the detection results, particularly upon the steering angle, wheel speeds, the lateral acceleration and the yaw rate (S2). The result of determination is stored in the memory unit 29.

Meanwhile, the driver demand torque computation unit 22 computes a driver demand torque RT from the throttling level of the accelerator (S3).

If the determination flag stored in the storage unit 29 indicates that the pendular motion is not imparted (No in S4), then the engine torque control unit 24 substitutes the driver demand torque RT for the current target engine torque $ET_n$ (S5). Next, the engine torque control unit 24 determines whether or not the driver demand torque RT is greater than the immediately preceding target engine torque $ET_{n-1}$ (S19), and if not greater (No in S19), then proceeds to the torque regulation process (S14) without imposing a ceiling on the gradient of the change in the target engine torque $ET_n$ (a description of such a ceiling imposed on the gradient will be given later). If the driver demand torque RT is greater than the immediately preceding target engine torque $ET_{n-1}$ (Yes in S19), then the engine torque control unit 24 proceeds to step S11.

On the other hand, if the determination flag stored in the storage unit 29 indicates that the pendular motion is imparted (Yes in S4), then the braking control unit 23 computes a braking control pressure PT by a known method (S6), and regulates the pressure for braking based upon the braking control pressure PT (S7). The yaw rate based permissible torque computation unit 24A computes a yaw rate based permissible torque YT, and the vehicle speed based permissible torque computation unit 24B computes a vehicle speed based permissible torque VT (S8). Next, the engine torque control unit 24 selects, as a tentative engine torque $ET_O$, a greater one of the yaw rate based permissible torque YT and the vehicle speed based permissible torque VT (S9), and further selects, as a current target engine torque $ET_n$, a smaller one of the selected engine torque $ET_O$ and the driver demand torque RT (S10).

When the target engine torque $ET_n$ is determined in this way, the engine torque control unit 24 imposes a ceiling on the gradient of the increase or decrease of the target engine torque $ET_n$. To be more specific, the engine torque control unit 24 determines whether or not the target engine torque $ET_n$ is smaller than the immediately preceding target engine torque $ET_{n-1}$, and if smaller (i.e., shown that the target engine torque $ET_n$ tends to decrease) (Yes in S11), then a greater one of a difference given by subtracting a predetermined value C1 from the immediately preceding target engine torque $ET_{n-1}$ and the target engine torque $ET_n$ is selected as a new target engine torque $ET_n$ (S12). The predetermined value C1 is a maximum value of the gradient of the decrease (the largest amount of change permissible for one cycle of the control) of the target engine torque $ET_n$.

On the other hand, if the engine torque control unit 24 determines in step S11 that the current target engine torque $ET_n$ is not smaller than the immediately preceding target engine torque $ET_{n-1}$ (i.e., shown that the target engine torque $ET_n$ tends to increase) (No in S11), then a smaller one of a sum given by adding a predetermined value C2 to the immediately preceding target engine torque $ET_{n-1}$ and the current target engine torque $ET_n$ is selected as a new target engine torque $ET_n$ (S13). The predetermined value C2 is a maximum value of the gradient of the increase (the largest amount of change permissible for one cycle of the control) of the target engine torque $ET_n$.

When the target engine torque $ET_n$ adjusted by imposing a ceiling on the gradient of increase or decrease thereof is determined in this way, the engine torque control unit 24 proceeds to exercise a torque control over the engine 30 with the determined target engine torque $ET_n$ (S14). In other words, when the torque of the engine 30 is to be limited, the engine 30 is regulated to be throttled back.

Under the control as described above, parameters for the tractor TR to which a pendular motion is imparted changes as will be described below with reference to FIGS. 6A-6G. FIGS. 6A-6G show a transition in which after a pendular motion of the tractor TR is detected, a trailer stability control is exercised and the pendular motion is thereby reduced to a stable state.

Figure 6A:
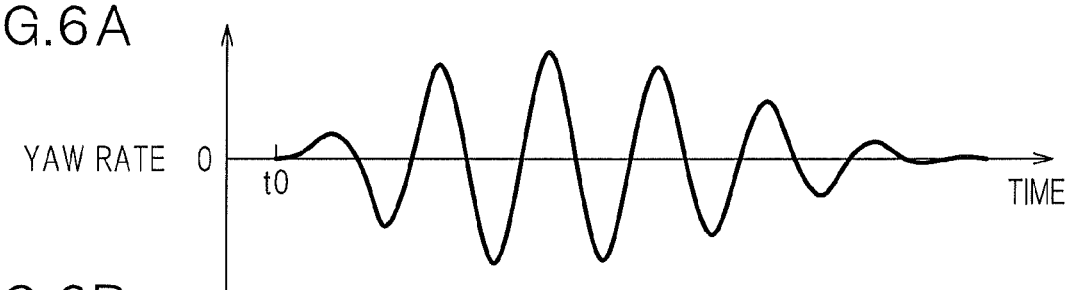
FIGS. 6A-6G show a timing chart in which changes of parameters effected when a pendular motion is imparted to a tractor are shown.
Figure 6B:
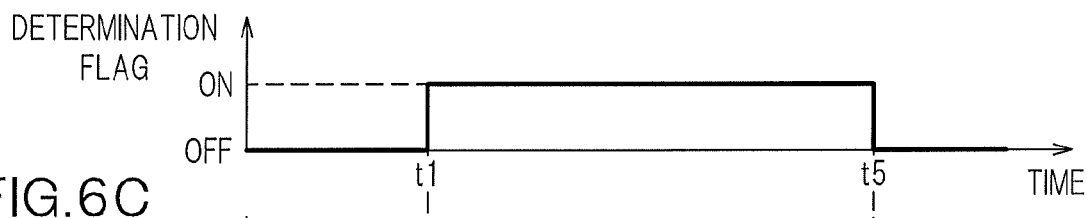
Figure 6C:
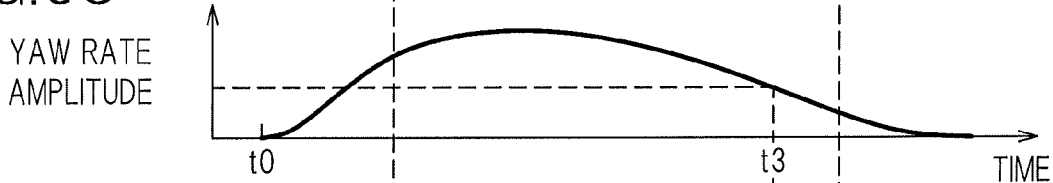

When the yaw rate amplitude becomes great enough after a while from a time t0 at which a yaw rate is detected in the tractor TR (showing that the tractor TR is about to yaw), the pendular motion determination unit 21 determines that a pendular motion is imparted to the tractor TR, and the trailer stability control is started at a time t1 (see FIGS. 6A, 6B and 6C).

Figure 6D:
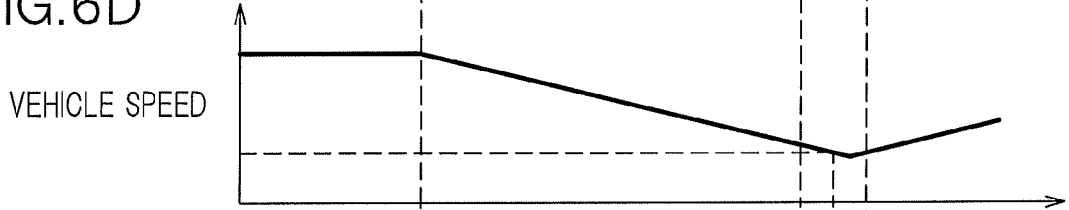
Figure 6E:
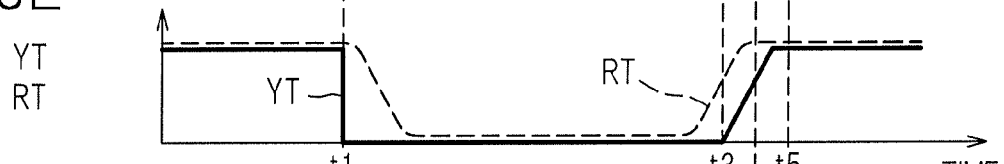
Figure 6F:
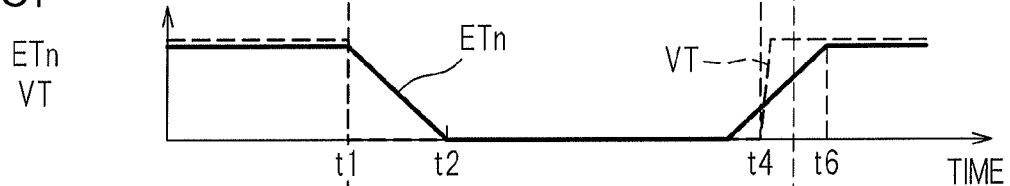
Figure 6G:
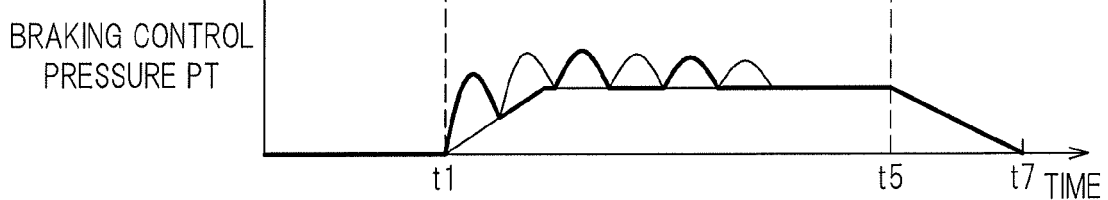

When the pendular motion is detected, a hydraulic pressure for braking is applied to one or more of the wheels W selected appropriately under the trailer stability control (see FIG. 6G), and thus the vehicle speed starts decreasing (see FIG. 6D). In FIG. 6G showing the change in the braking control pressure PT, a thick solid line and a thin solid line indicate the braking control pressure PT for right wheels and the braking control pressure PT for left wheels, respectively. As shown in the map of FIG. 4A, the yaw rate based permissible torque YT takes zero if the yaw rate amplitude is great enough. Therefore, the yaw rate based permissible torque YT at the time t1 becomes zero. Similarly, as shown in the map of FIG. 4B, the vehicle speed based permissible torque VT takes zero if the vehicle speed is great enough. Therefore, the vehicle speed based permissible torque VT at the time t1 becomes zero. As a result, the target engine torque $ET_n$ is regulated by the engine torque control unit 24 to decrease but a ceiling is imposed on the gradient of this decrease, so that the target engine torque $ET_n$ gradually decreases with a gradient defined by the predetermined value C1 (see FIG. 6F). At a time t2, the target engine torque $ET_n$ becomes zero. It is appreciated that the driver who has noticed that the pendular motion is imparted then lets the accelerator pedal AP up, so that the driver demand torque RT decreases (see FIG. 6E).

Since the pressure for braking is applied and the target engine torque $ET_n$ becomes zero, the vehicle speed gradually decreases, and the yaw rate starts gradually decreasing as well. When the yaw rate amplitude becomes small to some extent at a time t3, the yaw rate based permissible torque YT starts increasing (see FIG. 6E). When the yaw rate starts decreasing, the driver feels that the vehicle body starts stabilizing, and thus starts depressing the accelerator pedal AP. As a result, the driver demand torque RT increases according to the degree of depression of the accelerator pedal AP. Moreover, as the vehicle speed decreases, the vehicle speed based permissible torque VT becomes greater from a time t4 (see FIG. 6F).

When the yaw rate based permissible torque YT and the vehicle speed based permissible torque VT become greater in a manner as described above, the target engine torque $ET_n$ changes according to a greater one of the yaw rate based permissible torque YT and the vehicle speed based permissible torque VT within the driver demand torque RT (so as not to become greater than RT). However, since a ceiling is imposed on the gradient of the increase of the target engine torque $ET_n$, the target torque $ET_n$ increases according to the ceiling imposed on the gradient of the increase in FIG. 6F. When the target engine torque $ET_n$ increases in this way, the limitation on the torque of the engine 30 is gradually relaxed, and thus the vehicle speed starts increasing even before the determination flag indicative of the pendular motion being imparted becomes OFF (see FIG. 6D).

When the determination flag is turned OFF at a time t5, the braking control unit 23 starts bringing the braking control to an end, under which the braking control pressure PT is regulated to decrease with a predetermined gradient (see FIG. 6G).

The limitation on the target engine torque $ET_n$ starts being relaxed before the time t5 at which the determination flag is turned OFF, and thus completely lifted at a time t6 soon after the time t5, so that the target engine torque $ET_n$ reaches the driver demand torque RT. On the other hand, the braking control pressure PT starts decreasing from the time t5, and thus becomes zero at a time t7 which comes after the time t6. In other words, before the time t7 at which the braking control pressure becomes zero, the target engine torque $ET_n$ reaches the driver demand torque RT.

As described above, in the motion stabilizer 100 for a combined vehicle configured according to the present embodiment, the start of relaxing the limitation on the engine torque is timed to occur prior to the start of bringing the braking control to an end under the trailer stability control as initiated by the determination flag (indicating that the pendular motion is imparted) being turned OFF. Therefore, the driver becomes permitted to produce the engine torque by his/her operation on the accelerator from a time at or around the time when the driver starts to feel that the tractor TR is already back to a stabilized state. Accordingly, the driver can get a feel of acceleration according to his/her operation on the accelerator, and can thus be given an improved feel of drive when the motion of the tractor TR starts shifting to a stabilized state. Meanwhile, the braking control may be continued for the purpose of improving the feel of drive, so that the pendular motion of the tractor TR can be reduced steadily.

Since the limitation placed on the torque produced by the engine is relaxed based upon a determination as to whether the acceleration of the tractor TR can be permitted, which is made based upon the vehicle speed of the tractor TR and a value related to the yaw rate of the tractor TR, the driver's operation for acceleration can be responded to at earlier stages, so that the feel of drive can be improved.

Since the time when the limitation placed on the engine torque is relaxed completely (i.e., finally lifted) comes prior to the time when the braking control pressure reaches zero under the braking control, the behavior of the vehicle is made more responsive to the driver's operation on the accelerator in consonance with the driver's intention, so that the feel of drive can be improved more.

Although some illustrative embodiments have been described above, the present invention is not limited to the illustrated embodiments. Any modifications or changes may be made to any of their specific configurations appropriately without departing from the scope of the present invention.

For example, although the target engine torque $ET_n$ is determined, in the above-described embodiment, based upon the both of the yaw rate based permissible torque YT derived from the yaw rate amplitude (one example of the value related to the yaw rate) and the vehicle speed based permissible torque VT derived from the vehicle speed, the target engine torque $ET_n$ may be determined based upon either one of these values.

Although the ceilings are imposed on the gradients of decrease and increase of the target engine torque $ET_n$ in the above-described embodiment, such ceilings may not be required.

Although the above-described embodiment is configured such that the target engine torque $ET_n$ reaches the driver demand torque RT before the time when the braking control pressure becomes zero, but an alternative configuration may be feasible such that the target engine torque $ET_n$ reaches the driver demand torque RT after the time when the braking control pressure becomes zero.

In the above-described embodiment, the predetermined values C1, C2 which define the gradients of increase and decrease of the target engine torque $ET_n$ are different from each other, but the values C1 and C2 may be the same value.

What is claimed is:

1. A motion stabilizer for a combined vehicle including a tractor and a trailer connected to the tractor, the motion stabilizer comprising:
   a pendular motion determination unit configured to determine whether or not a pendular motion caused by a swaying motion of the trailer is imparted to the tractor;
   a braking control unit configured to exercise a braking control upon detection of the pendular motion; and
   an engine torque control unit configured to exercise an engine torque control for regulating an engine torque produced by an engine, which engine torque control includes placing a limitation on the engine torque upon detection of the pendular motion,
   wherein a start of the engine torque control unit relaxing the limitation on the engine torque is timed to occur prior to a start of the braking control unit bringing the braking control to an end.

2. The motion stabilizer according to claim 1, wherein the engine torque control unit is configured to relax the limitation on the engine torque based upon at least one of a vehicle speed of the tractor and a value related to a yaw rate of the tractor.

3. A motion stabilizer for a combined vehicle including a tractor and a trailer connected to the tractor, the motion stabilizer comprising:
- a pendular motion determination unit configured to determine whether or not a pendular motion caused by a swaying motion of the trailer is imparted to the tractor;
- a braking control unit configured to exercise a braking control upon detection of the pendular motion; and
- an engine torque control unit configured to exercise an engine torque control for regulating an engine torque produced by an engine, which engine torque control includes placing a limitation on the engine torque upon detection of the pendular motion,
- wherein a start of the engine torque control unit relaxing the limitation on the engine torque is timed to occur prior to a start of the braking control unit bringing the braking control to an end, and
- the engine torque control unit is configured to relax the limitation on the engine torque based upon at least one of a vehicle speed of the tractor and a value related to a yaw rate of the tractor, and the engine torque control unit includes:
  - a yaw rate based permissible torque computation unit configured to compute a yaw rate based permissible torque that is increased if the value related to the yaw rate of the tractor is smaller than a first predetermined yaw rate; and
  - a vehicle speed based permissible torque computation unit configured to compute a vehicle speed based permissible torque that is increased if the vehicle speed of the tractor is smaller than a first predetermined vehicle speed,
  - wherein the engine torque control unit is configured to select, as an engine torque permissible limit, a greater one of the yaw rate based permissible torque and the vehicle speed based permissible torque, and to permit the engine torque to be produced within the engine torque permissible limit.

4. The motion stabilizer according to claim 3, wherein the yaw rate based permissible torque computation unit is configured to set the yaw rate based permissible torque at a predetermined maximum value if the value related to the yaw rate is smaller than a second predetermined yaw rate which is smaller than the first predetermined yaw rate, and to compute the yaw rate based permissible torque such that the yaw rate based permissible torque decreases with increase in the value related to the yaw rate, if the value related to the yaw rate is in a range of values smaller than the first predetermined yaw rate and not smaller than the second predetermined yaw rate.

5. The motion stabilizer according to claim 4, wherein the vehicle speed based permissible torque computation unit is configured to set the vehicle speed based permissible torque at a predetermined maximum value if the vehicle speed is smaller than a second predetermined vehicle speed which is smaller than the first predetermined vehicle speed, and to compute the vehicle speed based permissible torque such that the vehicle speed based permissible torque decreases with increase in the vehicle speed if the vehicle speed is in a range of values smaller than the first predetermined vehicle speed and not smaller than the second predetermined vehicle speed.

6. The motion stabilizer according to claim 3, wherein the vehicle speed based permissible torque computation unit is configured to set the vehicle speed based permissible torque at a predetermined maximum value if the vehicle speed is smaller than a second predetermined vehicle speed which is smaller than the first predetermined vehicle speed, and to compute the vehicle speed based permissible torque such that the vehicle speed based permissible torque decreases with increase in the vehicle speed if the vehicle speed is in a range of values smaller than the first predetermined vehicle speed and not smaller than the second predetermined vehicle speed.

7. The motion stabilizer according to claim 3, wherein the braking control unit is configured to decrease a hydraulic pressure for braking with a gradient on which a ceiling is imposed, from the start of the braking control unit ending the braking control up to a time when the braking control pressure becomes zero, and
- wherein the engine torque control unit is configured to select a smaller one of a driver demand torque determined by a driver's operation on an accelerator and the engine torque permissible limit, to determine a target engine torque by imposing a ceiling on a gradient of increase in a value of the selected smaller one, and to regulate the engine torque based upon the target engine torque, such that the target engine torque reaches the driver demand torque before the time when the braking control pressure becomes zero.

* * * * *